US011951579B2

(12) United States Patent
Pereira Neto et al.

(10) Patent No.: US 11,951,579 B2
(45) Date of Patent: Apr. 9, 2024

(54) DEVICE AND METHOD FOR COOLING AND LUBRICATING TOOLS IN MACHINING PROCESSES

(71) Applicants: UNIVERSIDAD DEL PAIS VASCO—EUSKAL HERRIKO UNIBERTSITATEA (UPV/EHU), Vizcaya (ES); FUNDACIÓN TECNALIA RESEARCH & INNOVATION, Vizkaya (ES)

(72) Inventors: Octavio Manuel Pereira Neto, Vizcaya (ES); Adrián Rodríguez Ezquerro, Vizcaya (ES); López De Lacalle Marcaide Luis, Vizcaya (ES); Franck Andrés Girot Mata, Vizcaya (ES); Mariluz Penalva Oscoz, Vizkaya (ES); Rivero Rastrero Maria Asunción, Vizkaya (ES)

( * ) Notice: Subject to any disclaimer, the term of this patent is extended or adjusted under 35 U.S.C. 154(b) by 1535 days.

(21) Appl. No.: 16/305,006

(22) PCT Filed: May 11, 2017

(86) PCT No.: PCT/EP2017/061412
§ 371 (c)(1),
(2) Date: Nov. 27, 2018

(87) PCT Pub. No.: WO2017/202622
PCT Pub. Date: Nov. 30, 2017

(65) Prior Publication Data
US 2019/0160618 A1 May 30, 2019

(30) Foreign Application Priority Data

May 27, 2016 (EP) ..................................... 16382239

(51) Int. Cl.
B23Q 11/10 (2006.01)
F16N 7/32 (2006.01)
F16N 13/22 (2006.01)

(52) U.S. Cl.
CPC ...... *B23Q 11/1046* (2013.01); *B23Q 11/1061* (2013.01); *B23Q 11/1084* (2013.01); *F16N 7/32* (2013.01); *F16N 13/22* (2013.01); *F16N 2270/70* (2013.01); *Y02P 70/10* (2015.11)

(58) Field of Classification Search
CPC ........ F16N 7/32; F16N 13/22; F16N 2270/70; B23Q 11/1046; B23Q 11/1061; B23Q 11/1084
USPC ....................................................... 184/6.14
See application file for complete search history.

(56) References Cited

U.S. PATENT DOCUMENTS

| 2,876,661 | A | * | 3/1959 | Jaeger | ..................... | B23B 39/04 408/4 |
| 5,678,466 | A | * | 10/1997 | Wahl | .................. | B23Q 11/1046 83/171 |
| 6,349,481 | B1 | * | 2/2002 | Nelle | .................. | G01D 5/34707 33/701 |
| 8,048,830 | B1 | * | 11/2011 | Jackson | ............... | C10M 125/00 508/154 |
| 9,381,574 | B1 | * | 7/2016 | Jackson | .................. | B24B 55/03 |
| 2002/0038982 | A1 | * | 4/2002 | Katsuki | .................. | H02K 41/03 310/12.01 |
| 2005/0211029 | A1 | * | 9/2005 | Zurecki | .............. | B23Q 11/1061 239/128 |
| 2006/0123801 | A1 | * | 6/2006 | Jackson | ............. | B23Q 11/1061 62/52.1 |
| 2006/0124156 | A1 | * | 6/2006 | Jackson | ..................... | B24C 5/02 134/99.1 |
| 2011/0166692 | A1 | * | 7/2011 | Horn | ....................... | B23B 51/06 700/160 |
| 2012/0199421 | A1 | * | 8/2012 | Clarens | ..................... | F16N 7/30 184/6.21 |

(Continued)

FOREIGN PATENT DOCUMENTS

EP 2574424 A1 4/2013
EP 2832493 A1 2/2015
(Continued)

OTHER PUBLICATIONS

International Search Report dated Nov. 8, 2017 re: Application No. PCT/EP2017/061412, pp. 1-6, citing: EP 2 832 493 A1, EP 2 837 448 A2, WO 03/026843 A, WO 2009/129925 A1, U.S. Pat. No. 5,678,466 A.

(Continued)

Primary Examiner — Henry Y Liu
(74) Attorney, Agent, or Firm — CANTOR COLBURN LLP

(57) ABSTRACT

A device for cooling and lubricating a tool during a chip removal machining process, which includes: a first subsystem for cryogenic cooling that includes: a first entry configured to introduce $CO_2$ in liquid state in a first conduit of the device; a first exit configured to supply $CO_2$ in liquid state from a second conduit of the device; a third conduit located between the first and second conduit; and means for preventing the formation of dry ice in the first, second and third conduits; and a second subsystem for lubrication that includes means for supplying micro-particles of a cutting oil in liquid state; wherein the first subsystem and second subsystem are independent from each other, and wherein the first subsystem and second subsystem are configured to act either simultaneously or either one alone. Method of operation of the device.

13 Claims, 10 Drawing Sheets

(56) References Cited

U.S. PATENT DOCUMENTS

| | | | |
|---|---|---|---|
| 2014/0196273 A1* | 7/2014 | Balaji | G05D 7/0629 |
| | | | 222/52 |
| 2014/0353406 A1* | 12/2014 | Kapoor | B23Q 11/1046 |
| | | | 239/379 |
| 2015/0037110 A1* | 2/2015 | Wunderlich | B23Q 5/04 |
| | | | 408/1 R |
| 2017/0030516 A1* | 2/2017 | Kinner | B65D 83/203 |
| 2017/0320141 A1* | 11/2017 | Musil | B23Q 11/1053 |

FOREIGN PATENT DOCUMENTS

| | | |
|---|---|---|
| EP | 2837448 A2 | 2/2015 |
| WO | 03026843 A1 | 4/2003 |
| WO | 2009129925 A1 | 10/2009 |

OTHER PUBLICATIONS

Written Opinion dated Nov. 8, 2017 re: Application No. PCT/EP2017/061412, pp. 1-6, citing: EP 2 832 493 A1, EP 2 837 448 A2, WO 03/026843 A, WO 2009/129925 A1, U.S. Pat. No. 5,678,466 A.

* cited by examiner

DEVICE AND METHOD FOR COOLING AND LUBRICATING TOOLS IN MACHINING PROCESSES

TECHNICAL FIELD

The present disclosure belongs to the field of mechanical manufacturing and more specifically to lubrication and cooling systems for tools in machining processes.

BACKGROUND

To increase productivity in machining processes and considering the need to maintain and/or improve the superficial integrity after the process, it is customary to use lubricants and coolants. The most common cutting fluids used in machining processes based on shaving removing with coolants, are oil emulsions with a mineral base where the concentration of mineral oil varies between 5% and 40%.

For example, U.S. Pat. No. 5,678,466 describes an external cooling and lubrication device used in the contact area of a saw and the part that is being machined. Two containers contain both fluids in liquid state, one of which acts as a lubricant, while the other acts as a coolant. Each fluid in liquid state is applied over the machined area using independent spray type instruments.

One of the alternatives that has appeared to eliminate coolants from machining processes is the use of cryogenic liquids as cutting fluids. This technique is known as cryogenic cooling and consists in assisting machining with liquids and/or gases at very low temperatures with the aim of reducing the cutting temperature. Among the advantages of cryogenic cooling is the fact that the technology is clean, safe and environmentally friendly.

The gases that are normally injected in the cutting area are liquid nitrogen ($LN_2$) and liquid carbon dioxide ($CO_2$). The reasons for using $LN_2$ as cutting fluid are that it is an inert gas that is found in large amounts in the atmosphere and has high cooling capacity ($-196°$ C.). On the other hand, $LN_2$ is difficult to store because it is continuously boiling when injected in containers at $-196°$ C. and at an atmospheric pressure that are not completed isolated. That is why $LN_2$ generates overpressure inside the container which, once a certain value is reached, triggers a safety valve that evacuates nitrogen in the form of exhaust, thereby preventing risk of explosion due to nitrogen overpressure. On the contrary, $CO_2$ has lower cooling capacity ($-78°$ C.), can be stored in liquid state at room temperature in pressurised containers at 5.5-6 MPa and can dissolve oils when it is in supercritical state, which makes it more attractive from an industrial point of view. However, use of $CO_2$ requires a special regulation system to prevent dry ice from forming in the conduits of the system before it expands when exiting the system. This is the point where $CO_2$ regulation systems come into play.

Nowadays, there are mainly two types of $CO_2$ regulation systems: The first type (Type-1) is strictly a cryogenic regulation system used simply to prevent the $CO_2$ from solidifying inside the injection system conduits. However, the second type (Type-11) not only prevents the formation of dry ice, but is also capable of injecting pulverised oil particles in the cutting area along with the $CO_2$.

An example of the Type-1 regulation system that can be applied to machining processes is that described in U.S. Pat. No. 7,293,570B2. In this system the $CO_2$ solidifies in microparticles under control to prevent the obstruction of the conduits. The system consists of a conduit with two coaxial channels for this purpose. $CO_2$ is introduced in liquid state at 7 MPa through the central channel. The initial diameter of this channel is small—the recommended diameter is 0.5 mm, but this diameter increases stage-by-stage until the exit is reached. In order to drag the solid particles of $CO_2$ that are formed and prevent obstruction of the central channel, $CO_2$ is introduced in gaseous state through the outer channel at a pressure that varies between 0.07 and 1.72 MPa. Both conduits are joined just at the exit of the system, so the $CO_2$ in gaseous state generates a Venturi effect that drags the dry ice particles to the outside, thereby obtaining the cutting fluid to inject in the cutting area.

The most common regulation systems used currently are Type-II. This is because they are intended for the machining of super-alloys, which are known to be difficult-to-cut materials and are in increasing demand by the aeronautic sector. During the machining of these types of materials, the tool is subjected to high stresses that cause premature wear, requiring both cooling and lubrication. Some of the systems of this kind are listed below.

Patent US2011/0166692A1 describes a hybrid system between Type-I and Type-II; the system can pulverise oil particles and use cryogenic technology but separately. In other words, it cannot cryogenize the oil particles. This system is based on placing a hose along the spindle of the machine-tool with two coaxial channels. The central channel is fed with an aerosol of oil micro-particles and $CO_2$ is introduced in the outer channel in supercritical state. Operation is based on using one channel or the other according to the needs of the machining operation. This system is specifically designed for drilling operations where the micro-particle spray is injected while the drill bit is machining the material. Once the bit finishes machining the hole, the spray channel closes during bit removal and $CO_2$ is injected in supercritical state to clean the remains of shavings and oil.

U.S. Pat. No. 8,048,830B1 describes a Type-II regulation system. The starting point is a pressurised tank containing cutting oil that has to withstand more than 6 MPa of pressure. $CO_2$ is introduced in this tank, whether in non-supercritical state along with solid micro-particles, $CO_2$ in dense-semi-liquid state or $CO_2$ in pure gaseous state. Once introduced, the pressure rises and it comes into contact with the cutting oil, which absorbs the $CO_2$ to form a carbonated cutting fluid. The increased pressure in the tank, caused by the introduction of the $CO_2$ or the sublimation of the $CO_2$ particles, increases the carbonation of the cutting fluid which approaches saturation. The carbonated cutting fluid is then pumped through a conduit to the cutting area. By doing this, and passing from relatively high pressure to ambient conditions, the carbonated lubricant boils and the $CO_2$ evaporates, producing a $CO_2$ mist that is comprised of gas and cutting oil.

However, in Superkar et al. (2012). Performance of supercritical carbon dioxide sprays as coolants and lubricants in representative metalworking operations. Journal of Materials Processing Technology, 212(12):2652-2658, to obtain a homogeneous mixture of $CO_2$ and cutting oil, a system equipped with a pressurised tank containing oil was used. Liquid $CO_2$ was introduced in the tank, after which heat was applied by electrical resistors to carry the $CO_2$ over its triple point and make it soluble in oil. After completing the process, the mixture is simply pumped to the cutting area through a channel located at the top of the tank.

Lastly, patent EP2574424B1 describes a method where an oil micro-particle spray is cooled directly or indirectly. In both cases, the system is equipped with two channels; an oil micro-particle spray is introduced in one and $CO_2$ in liquid stat is introduced in the other. To cool the spray indirectly, the conduits are placed so they are in contact, thereby lowering the temperature of the channel containing the spray by conduction. An additional channel, also containing $CO_2$ in liquid state, can be used to improve heat transfer in this case. However, to cool the spray directly, the design of the conduits changes in such a way that they are communicated, either at the end of the tool or at the head of the tool holder.

As shown in the state of the technique, the need not only to cool but also to lubricate the cutting area while machining difficult-to-cut materials rules out Type-I $CO_2$ regulation systems for these types of applications. As regards the Type-II systems described above, these are not completely functional in an industrial setting. This is either because they are not a good solution for machining difficult-to-cut materials or because the solution is a specific ad-hoc design for each case that cannot be adapted to any machining process and machine-tool used currently.

BRIEF SUMMARY

The present disclosure intends to provide a solution for the need for a cooling and lubricating device for tools in machining processes, capable of injecting both carbon dioxide ($CO_2$) in liquid state and micro-particles of a cutting fluid in spray form into the machining area simultaneously, and $CO_2$ in liquid state or micro-particles of cutting fluid separately (only $CO_2$ or only cutting fluid micro-particles), depending on the need of the material to be machined. The device is comprised of a $CO_2$ regulation system that prevents the formation of dry ice. The device has been designed so it can adapt to the most common machining processes, such as milling, lathing and drilling. Likewise, the proposed device is fully portable, so it can be used in different machine tools without requiring prior installation for proper operation.

In other words, depending on the material to be machined, either $CO_2$ is injected in liquid state to be used as cutting fluid (cryogenic cooling) or, if required, a spray formed by cutting oil micro-particles is also injected to assist lubrication by the $CO_2$ in liquid state, or only a spray formed by oil cutting micro-particles is injected to lubricate the machining area. The last option (lubrication without cooling) can be applied, for example, in aluminium part machining processes.

Therefore, the device is capable of supplying $CO_2$ in liquid state while avoiding obstruction of injection system conduits cause by the formation of dry ice; the device is also capable of injecting cutting fluid (normally oil) micro-particles in the form of spray. Moreover, the supply of $CO_2$ is continuous and controlled. This continuous and controlled supply can be interrupted when necessary by using an algorithm designed for that purpose.

The device is divided into two subsystems that are completely differentiated but governed electronically by common controls (preferably a Programmable Logic Controller (PLC) so the two subsystems can be used separately or in conjunction. The first subsystem is in charge of supplying $CO_2$ in liquid state and the second is in charge of pulverising the cutting oil to form a spray with those particles.

In a first aspect of the disclosure, a device is for cooling and lubricating a tool during a chip removal machining process that comprises: a first subsystem for cryogenic cooling that comprises: a first entry (input) configured to introduce $CO_2$ in liquid state through a first conduit of the device; a first exit (output) configured to supply $CO_2$ in liquid state from a second conduit of the device; a third conduit placed between the first and second conduits; and means for preventing formation of dry ice in those first, second and third conduits; and a second subsystem for lubrication that comprises means for supplying micro-particles of a cutting oil in liquid state; both subsystems are independent and are configured to operate either simultaneously or each one alone.

In a possible embodiment, the means for preventing the formation of dry ice in said first, second and third conduits are implemented by means of means for pressurising said conduits above the triple point of $CO_2$ before injecting the $CO_2$ in liquid state through the exit.

In a more specific embodiment, the means for pressurising said first, second and third conduits above the triple point of $CO_2$ comprises a second entry configured to introduce $CO_2$ in gaseous state in a fourth conduit of the device; a fifth conduit placed after said fourth conduit; a first solenoid valve configured to control the passage of $CO_2$ in liquid state between the first conduit and the third conduit; a second solenoid valve configured to control the passage of $CO_2$ in gaseous state between the fifth conduit and a sixth conduit; a first no-return valve placed to communicate said first conduit and third conduit, so that when said first solenoid valve is closed, passage of $CO_2$ in gaseous state is allowed from the third conduit towards the first conduit before introducing the $CO_2$ in liquid state through the first entry; and a second no-return valve placed to communicate said third and sixth conduits, so that when said second solenoid valve is open, circulation of the $CO_2$ in gaseous state is allowed from the sixth conduit towards the first solenoid valve but not the other way around, impeding the advance of $CO_2$ in liquid state towards the second solenoid valve.

Moreover, the means to pressurise the first, second and third conduits above the triple point of the $CO_2$ can also comprise a first shut-off valve placed on the first conduit and a second shut-off valve placed on the fourth conduit, configured to depressurise the first subsystem if necessary.

In addition, the means to pressurise said first, second and third conduits above the triple point of the $CO_2$ can also comprise a first pressure regulator for $CO_2$ in liquid state and a second pressure regulator for $CO_2$ in gaseous state, the first pressure regulator being placed between the third and second conduits; and the second pressure regulator being placed between the fourth and fifth conduits.

In a possible embodiment, the means for supplying micro-particles of a cutting oil in liquid state, comprise: a third entry configured to introduce pressurised air into a seventh conduit of the device; a tank configured to supply cutting oil in liquid state through an eighth conduit; a third solenoid valve configured to control the passage of pressurised air to the seventh conduit; a fourth solenoid valve to control the passage of cutting oil to the eighth conduit; a coupling designed to join said seventh and eighth conduits in a single conduit; and a nozzle placed at the end of the exit of said conduit, the nozzle being configured to pulverise the cutting oil by the Venturi effect so it can be injected.

In a more specific embodiment, the coupling is a T-shaped coupling, in which the seventh and eighth conduits are joined axially in that conduit. Preferably, the exit conduit of the T-shaped coupling is a hose with two coaxial channels: an internal conduit configured so the cutting oil can flow in liquid state, the internal conduit being surrounded by an outer wall, configured so that the pressurised air can flow between the internal conduit and the outer wall.

In addition, the means for supplying the micro-particles of a cutting oil in liquid state can comprise a third pressure regulator located between a ninth conduit located at the exit of the third entry and a tenth conduit located at the entry of the third solenoid valve.

In a possible embodiment, the device also comprises control means configured to control both the first subsystem and the second subsystem.

In a possible embodiment, the device comprises a plurality of magnetic legs configured to couple to a machine-tool.

In a second embodiment of the disclosure, a method of operating a device like the one above is provided. The method comprises the following stages for the injection of $CO_2$ in liquid state through the exit coupling (first exit): opening the second solenoid valve to control the passage of $CO_2$ in gaseous state between the fifth conduit and the sixth conduit; pressurising the first, second and third conduits above the triple point of the $CO_2$; opening the first solenoid valve controlling the passage of $CO_2$ in liquid state between the first conduit and the third conduit; injecting $CO_2$ in liquid state through the first exit.

In a possible embodiment, the method comprises the following stages to interrupt the injection of $CO_2$ in liquid state through the first exit: closing the first solenoid valve to control the passage of $CO_2$ in liquid state; sweeping at least the second and third conduits of $CO_2$ in liquid state by injecting $CO_2$ in gaseous state pressurised above the triple point; closing the second solenoid valve that controls the $CO_2$ in gaseous state.

In a possible embodiment, the method comprises the following stages for simultaneous injection of $CO_2$ in liquid state and a spray formed by micro-particles of a cutting oil in liquid state: opening the second solenoid valve to control the passage of $CO_2$ in gaseous state and the third solenoid valve that controls the passage of pressurised air towards the seventh conduit; pressurising the first, second and third conduits above the triple point of the $CO_2$; opening the first solenoid valve controlling the passage of $CO_2$ in liquid state and the fourth solenoid valve controlling the passage of the cutting oil.

In a possible embodiment, the method comprises the following stages to interrupt the simultaneous injection of $CO_2$ in liquid state and a spray formed by lubricant micro-particles in liquid state: closing the first solenoid valve that controls the passage of $CO_2$ in liquid state and the fourth solenoid valve that controls the passage of the cutting oil; sweeping at least the second and third conduits of $CO_2$ in liquid state by injecting $CO_2$ in gaseous state pressurised above the triple point; closing the second solenoid valve to control the passage of $CO_2$ in gaseous state and the third solenoid valve controlling the passage of the pressurised air.

This device (and method) not only presents a solution for the formation of dry ice inside the conduits through which the $CO_2$ in liquid state passes, but also allows simultaneous use of cryogenic cooling assisted by micro-particles in the form of spray, while also presenting other clear advantages versus the equipment described above in the state of the technique. Thanks to the electronic control of all the solenoid valves by the PLC, this equipment allows separate use of the two technologies that comprise it; in other words, the use of cryogenic cooling or lubrication by MQL, depending on machining needs. On the other hand, it has not been developed for a single operation or specific machine-tool; rather, the equipment is fully portable and interchangeable and can be adapted to any machine-tool easily and flexibly to be used in the most common machining operations. Moreover, this system allows using cryogenic cooling not only outside the tool, but also inside the tool. In fact, as regards milling, when cryogenic cooling is used inside the machine, it is used as a heat exchanger, resulting in considerable savings of $CO_2$ in liquid state and an increase in the useful life of the machine. When the two subsystems are used simultaneously and both fluids are injected in the cutting area, all the cooling power of the $CO_2$ is used, not only to cool said cutting area, but also to cool the oil micro-particles (i.e., the lubricant). Thus, the oil micro-particles reach temperatures near −78° C. at the same time that the cutting temperature drops. On the other hand, since there is no pressurised tank containing cutting oil, oil refilling in the storage tank can be done while it is being used without entailing any risk or the need to stop the equipment to refill the tank. Lastly, thanks to the electronic control system governed by the PLC, cutting oil consumption is fully controlled by supplying the exact flow of oil needed at each moment.

In sum, this disclosure achieves both separate and combined injection of $CO_2$ in liquid state and an aerosol of oil micro-particles. In addition, the equipment installation can be completely "plug&play", both in new and existing machine-tools and it can be used in any of the most common machining operations.

These and other advantages of the disclosure will become apparent from the description that follows.

BRIEF DESCRIPTION OF THE DRAWINGS

To complement the description and with the aim of helping to provide a better understanding of the characteristics of the disclosure in accordance with an example of a practical embodiment of the disclosure, the following set of figures is included as an integral part of the description. What is represented in these figures is not restrictive and is for illustrative purposes only.

FIG. 1A shows a view of the front part of the device. FIGS. 1B and 1C show details of some of the connections of the device.

FIG. 1D shows a perspective view of the device, in which the bottom of the device can be seen. FIG. 1E shows the components that are inside the housing of the device.

DETAILED DESCRIPTION

In this text, the term 'comprises' and its variants (such as 'comprising', etc.) should not be interpreted in an excluding sense, that is, these terms do not exclude the possibility that what is described may include other elements, steps, etc.

In the context of the present disclosure, the term 'approximately' and its family of terms (such as 'approximate', etc.) should be understood as indicative values very close to those accompanying the previously mentioned term. That is to say, a deviation from an exact value should be accepted within acceptable limits, since a person skilled in the art will understand that said deviation from the indicated values is inevitable due to inaccuracies of measurement, etc. The same applies to the terms 'around' and 'substantially'.

The following description should not be interpreted as restrictive, but is provided to describe the general principles of the disclosure. The following embodiments of the disclosure are described as examples, with reference to the figures mentioned, which show devices, methods ad results, depending on the disclosure.

Figure 1A:
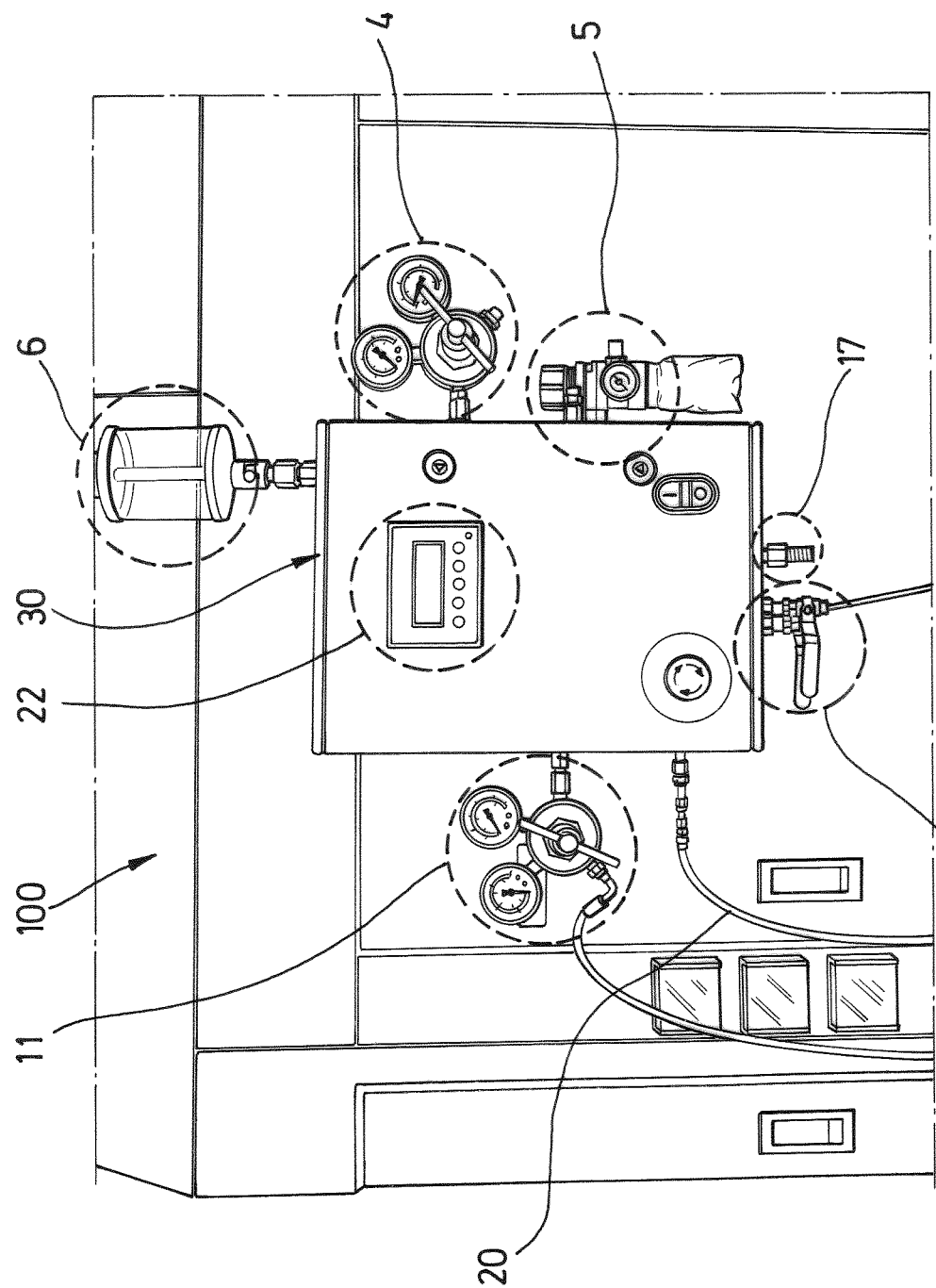
FIGS. 1A to 1E depict different views or details of the device in accordance with a possible embodiment of the disclosure.
Figure 1B:
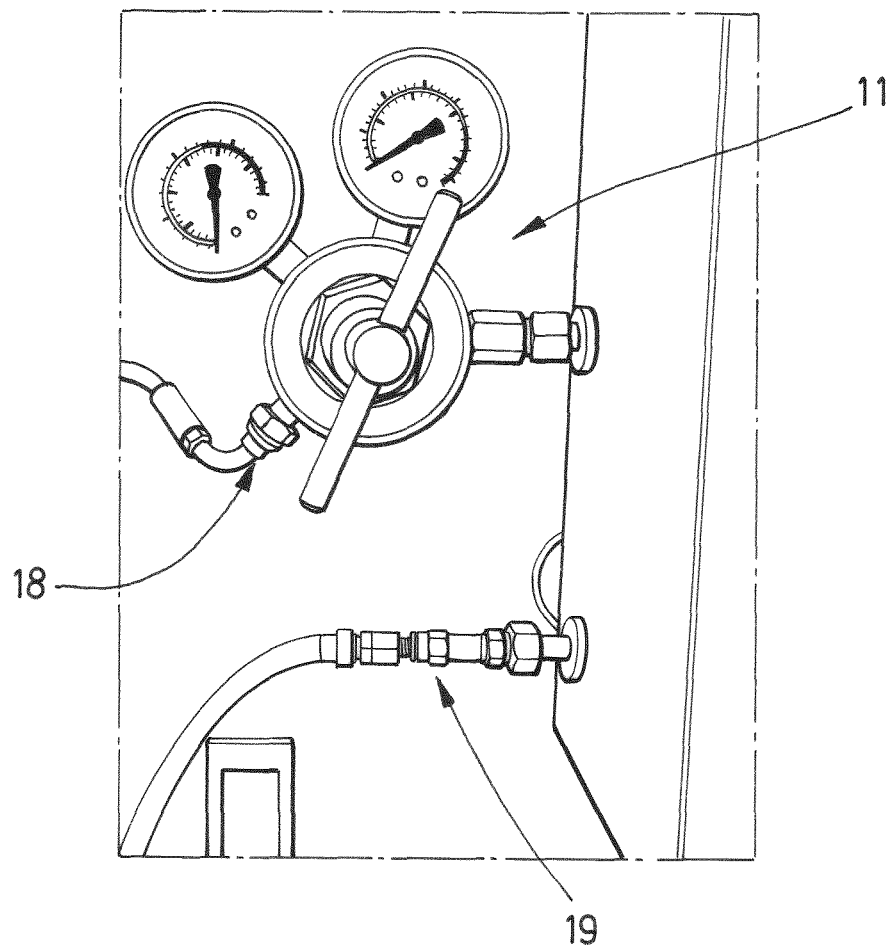
Figure 1C:
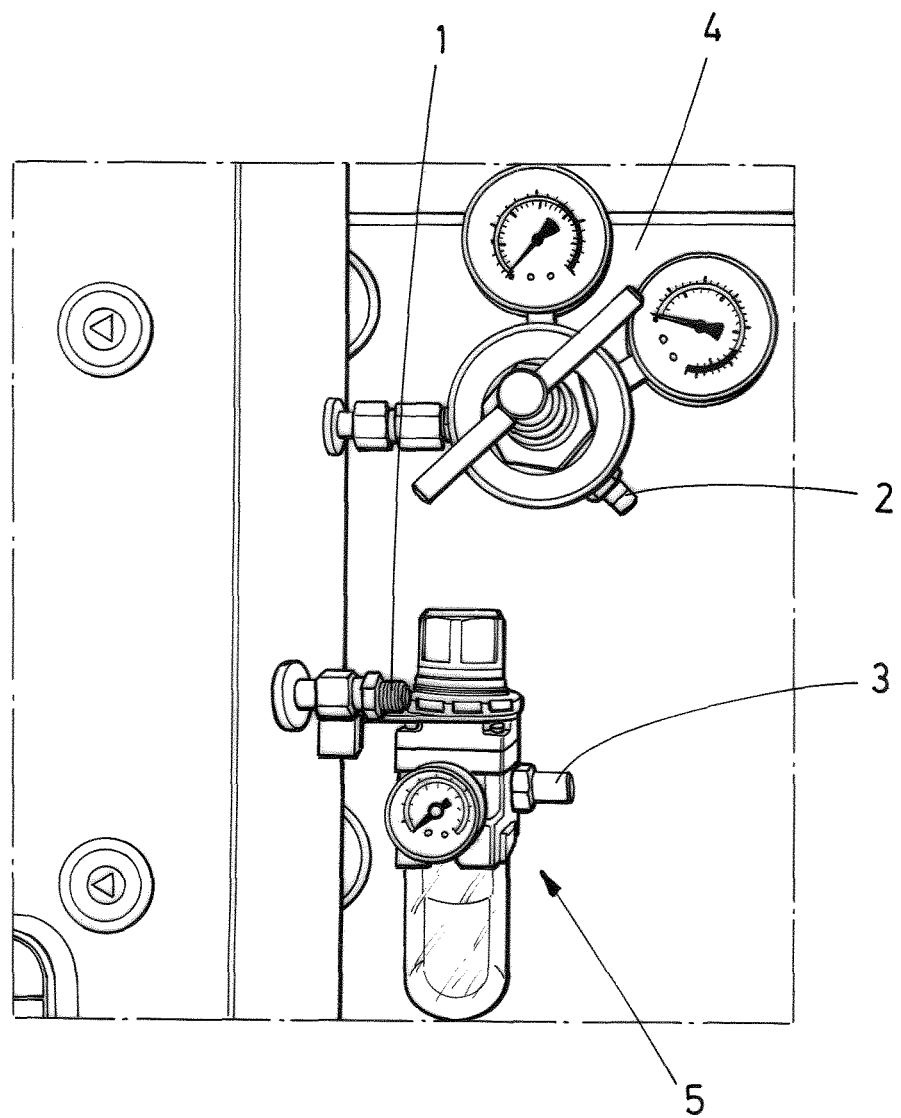
Figure 1D:
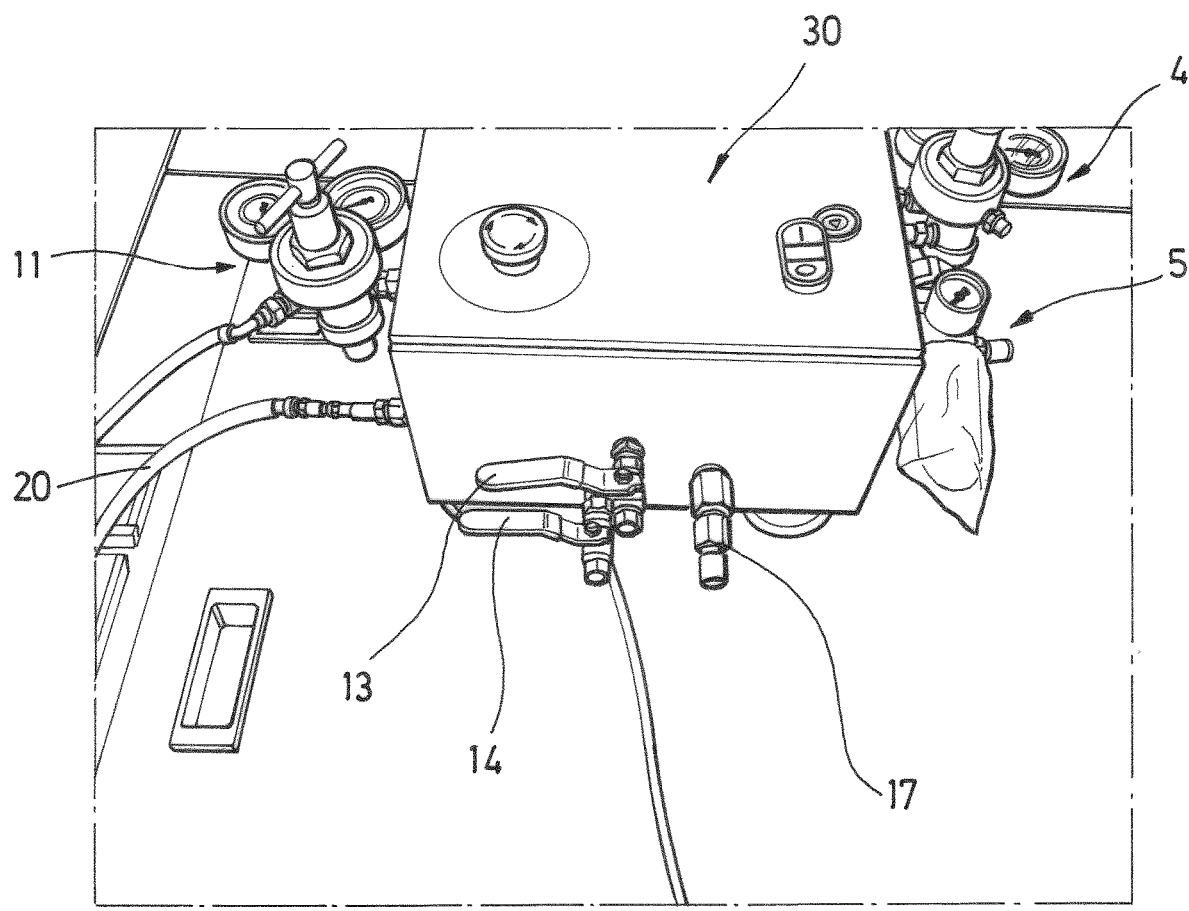
Figure 1E:
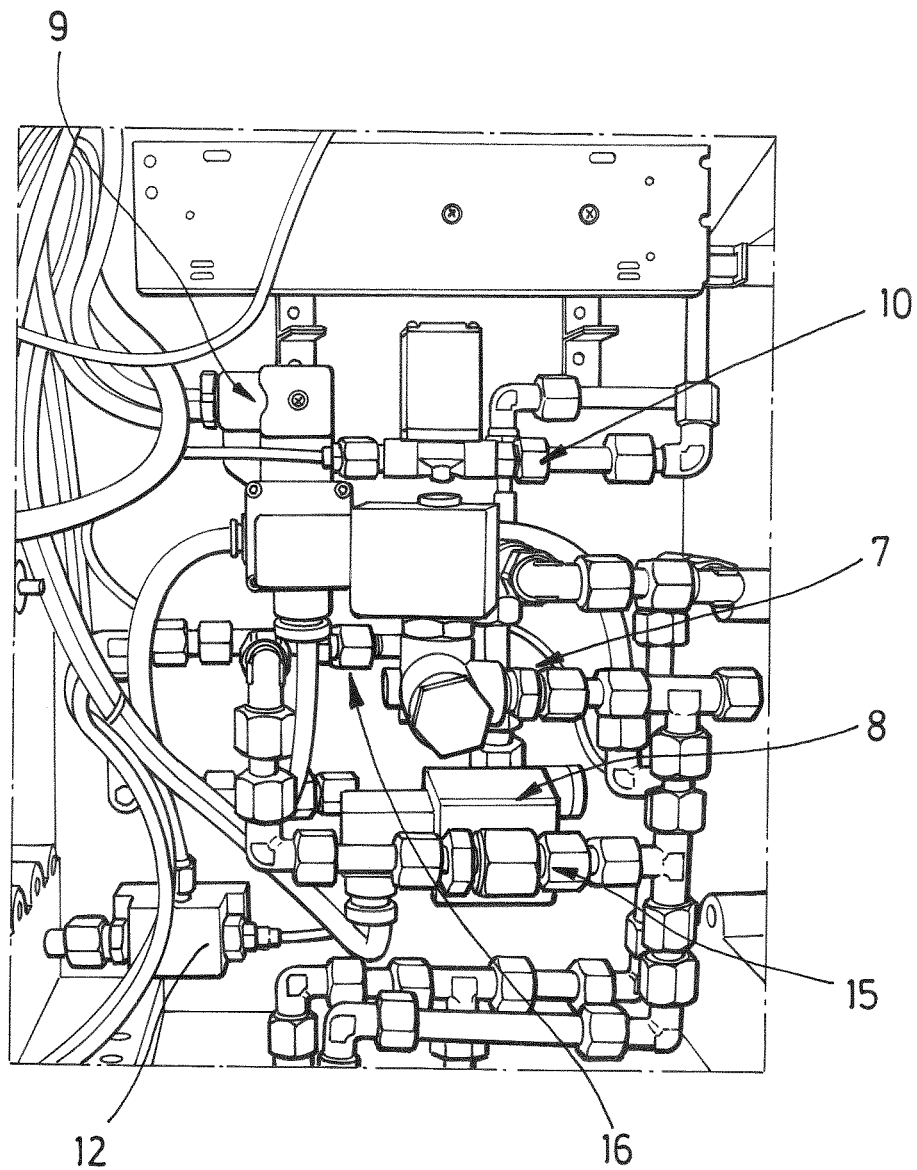
Figure 2:
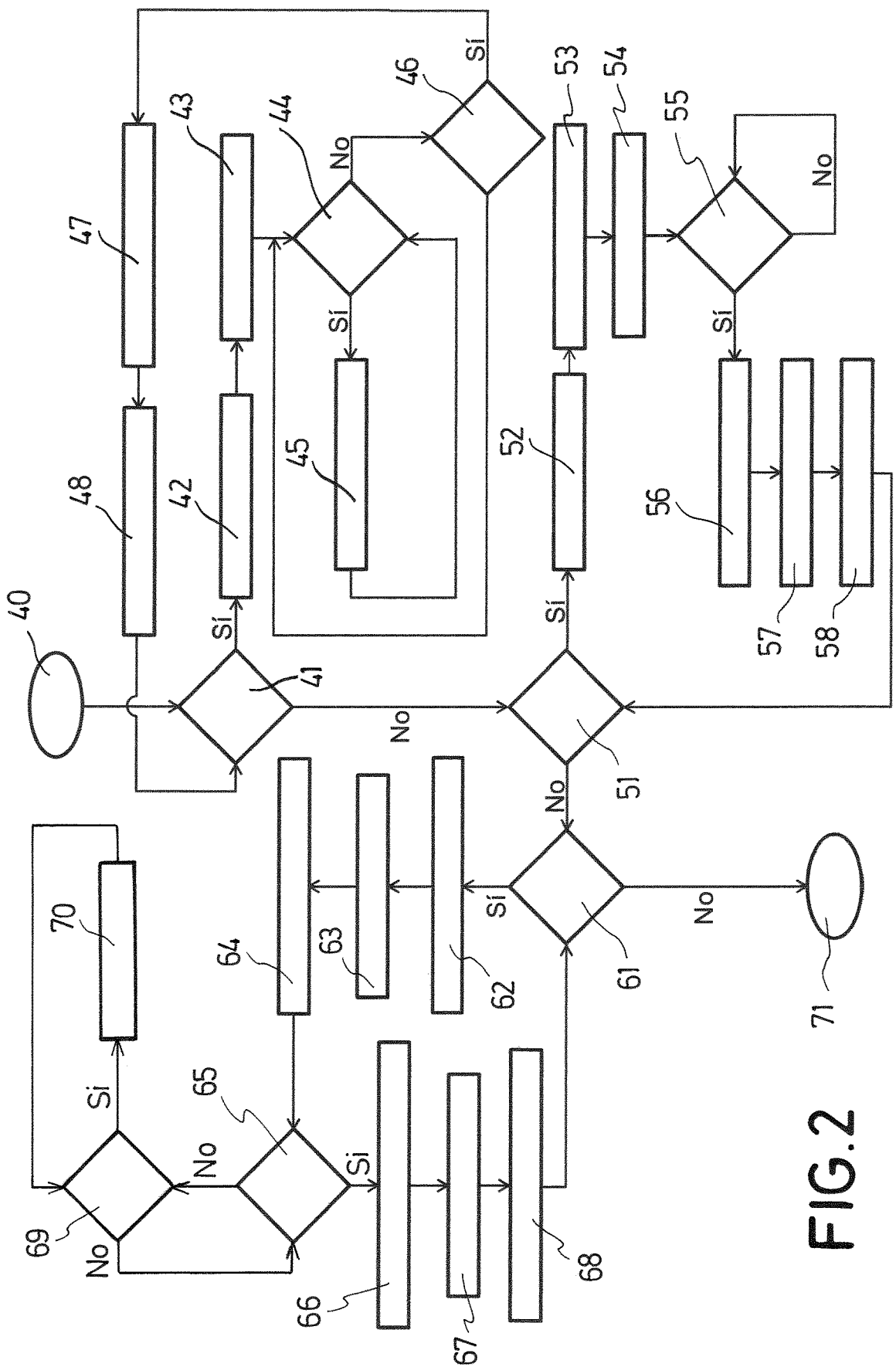
FIG. 2 shows a flowchart of an algorithm used to control the equipment in accordance with a possible embodiment of the disclosure.
Figure 3:
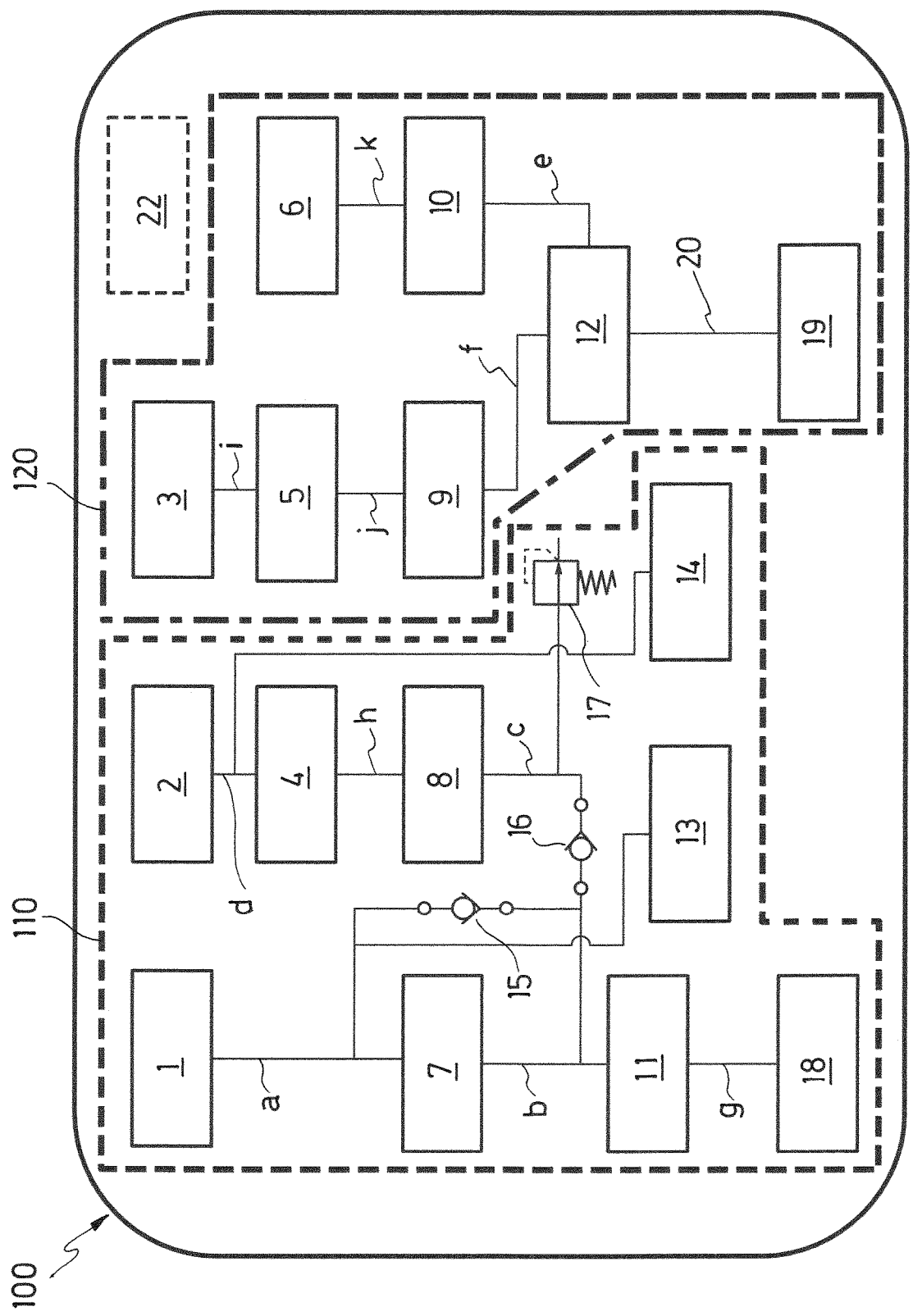
FIG. 3 shows a sketch of the equipment in accordance with a possible embodiment of the disclosure.

FIGS. 1A to 1E depict several views of a device 100 in accordance with a possible embodiment of the disclosure. The device 100 is formed by a housing 30 that houses several components and by other components located outside the housing 30. The internal and external components form the device 100. The device 100 is portable and easy to couple to any machine-tool to assist in the most common machining operations. The device 100 is completely separate from the machine. For "plug&play" installation, the device 100 is equipped with magnetic legs, not illustrated, that are used to couple it to any machine without difficulty. The various components of the device 100 are controlled by control means 22. These control means 22, which are configured to automate electro-mechanical processes, comprise processing means, such as a computer. Preferably, these control means 22 are a PLC (Programmable Logic Controller). FIG. 2 shows a flowchart of an algorithm used by the control means 22. The algorithm is described in detail further along. FIG. 3 shows a block diagram sketch of the device 100 illustrated in FIGS. 1A-1E.

The device 100 is divided into two subsystems 110, 120 that are completely differentiated but governed electronically by the control means 22, preferably a PLC, shared by the two subsystems. A first subsystem 110 is in charge of supplying $CO_2$ in liquid state (also known as the regulation subsystem for $CO_2$ in liquid state) and a second subsystem 120 is in charge of pulverising the cutting oil to form a spray with the pulverised particles (also known as the cutting oil pulverising subsystem).

The first subsystem 110 has been developed in such a way as to prevent the formation of dry ice inside the conduits that $CO_2$ travels through in liquid state (conduits "a", "b" and "g" in FIG. 3). In conduits "a" and "b", the $CO_2$ in liquid state is at ambient temperature. The temperature of the $CO_2$ in liquid state drops when it passes through the pressure regulator 11. The temperature drops due to the drop in pressure. And once the $CO_2$ in liquid state is injected (through the exit 18), it reaches −78° C. because it is completely depressurised. The cryogenic temperature of $CO_2$ is −78° C. To prevent the formation of dry ice, this subsystem 110 is equipped with two entry channels (entry or input 1 that supplies the $CO_2$ in liquid state, from which channel or conduit "a" is accessed and the entry or input 2 that supplies $CO_2$ in gaseous state, from which channel or conduit "d" is accessed) that are communicated as explained further on, and an exit channel or conduit "g". An end of a hose or conduit, not illustrated because it is not part of device 100, will be connected to said coupling 18. The other end of the hose or conduit will be connected either to a nozzle, if the intention is to use $CO_2$ supplied by the subsystem 110 as external cutting fluid, or to the entry of the coupling provided with the machine-tool being used, with the intention of injecting said $CO_2$ internally in the tool.

Figure 6:
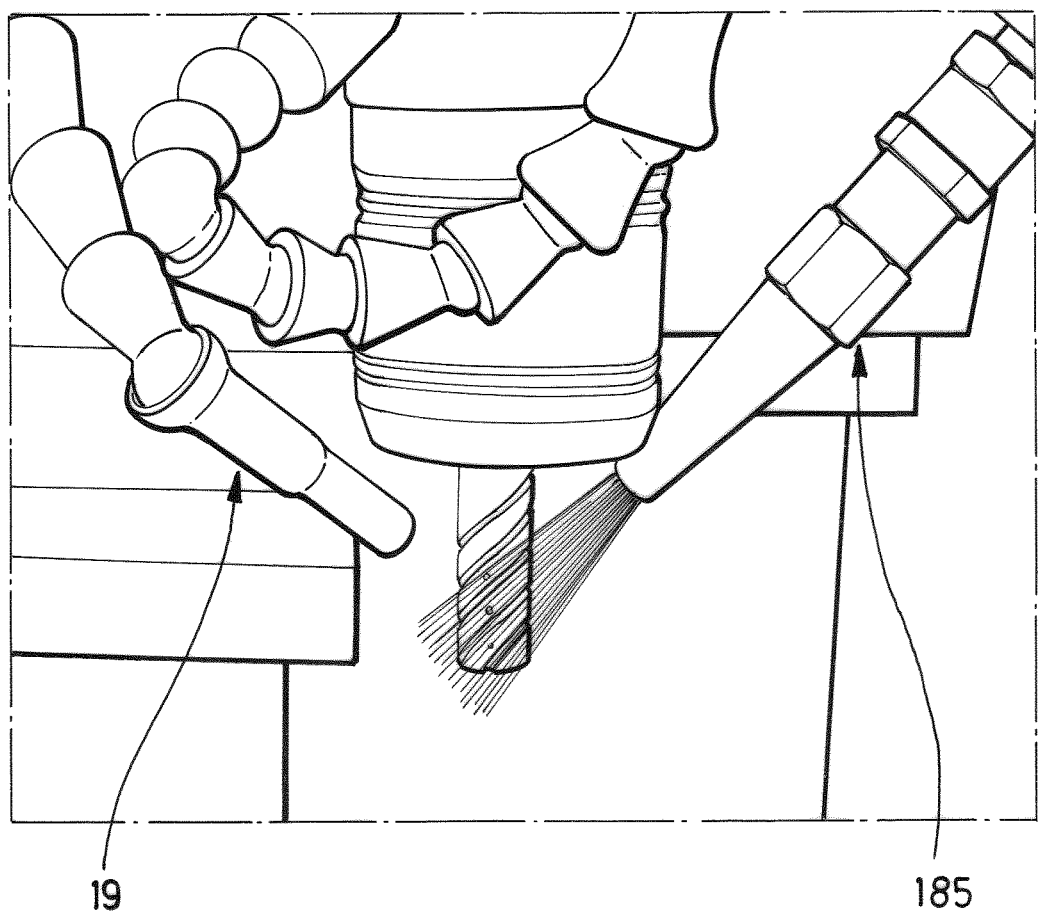
FIG. 6 shows an example of use of the device externally to the part that is being machined.
Figure 7A:
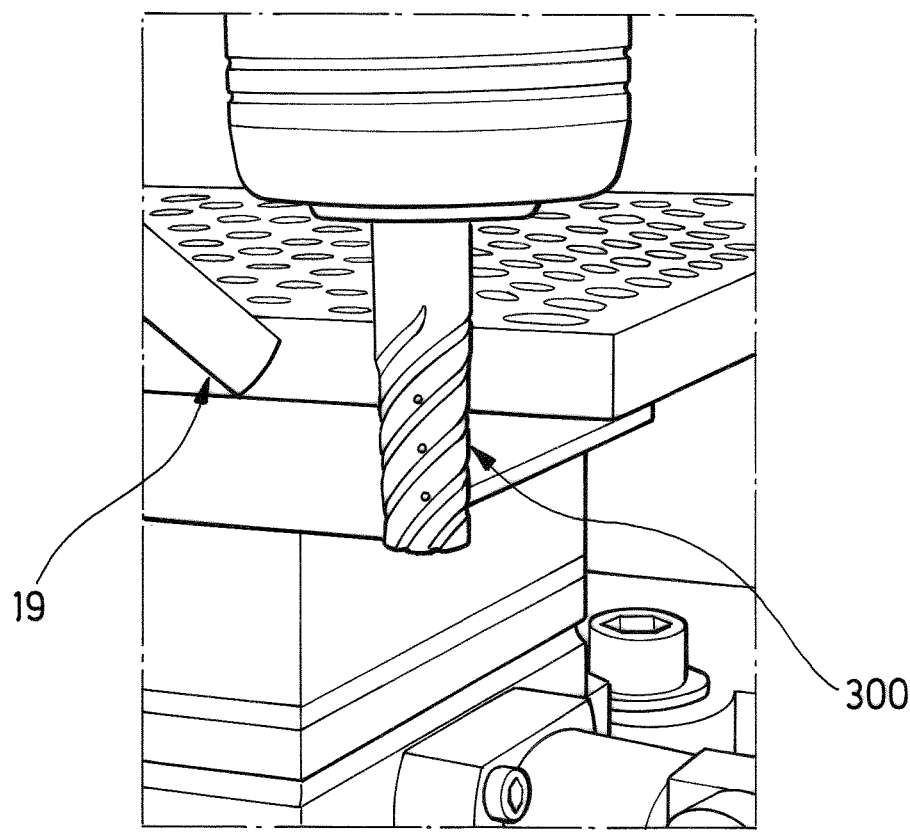
FIGS. 7A and 7B show an example of use of the device internally to the tool used for machining.
Figure 7B:
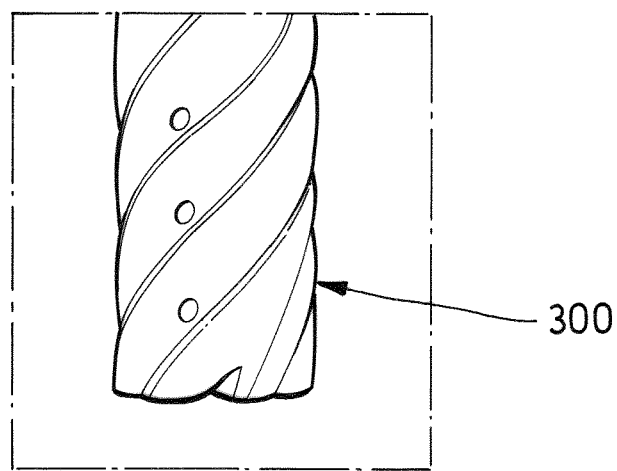

FIG. 6 shows an example of use of the device in the first option (external use). In other words, in this example a hose has been connected to the coupling 18 and the other end of the hose has been connected to a nozzle 185 to externally cool the part that is being machined. Also illustrated is the MQL nozzle 19, which supplies pulverised oil externally. FIG. 7 shows an example of use of the device in the second option (internal use). As shown, only liquid $CO_2$ passes through the inside of the tool to be cooled, while the pulverised oil is always supplied externally, injected through the nozzle 19. The liquid $CO_2$ passes through an internal conduit of the machine. The liquid $CO_2$ exits through some openings 300 of the tool coupled to the machine. The machine and its internal conduit lie outside the scope of the present disclosure. That is, the cutting oil for lubrication is always supplied externally to the machine, while the liquid $CO_2$ for cooling can be supplied either externally (FIG. 6) or internally (FIG. 7).

Returning to FIG. 3, each entry channel "a", "d" of the first subsystem 110 is controlled electronically by a closing solenoid valve 7, 8, respectively. More precisely, the closing solenoid valve 8 of the conduit of $CO_2$ in gaseous state is not located on conduit "d" itself, but on its extension, after a pressure regulator 4, on the conduit referenced as "h". The $CO_2$ in gaseous state is used to pressurise the conduits of the subsystem above the triple point of the $CO_2$ (0.511 MPa and −56.4° C.) before injecting the $CO_2$ in liquid state (through the coupling 18). The conduits that really need to be pressurised above the triple point to prevent the formation of dry ice are conduits "a", "b" and "g", since the liquid $CO_2$ will be travelling through these. For example, as regards conduit "a": when a new bottle of $CO_2$ in liquid state is going to be connected to the device 100 via the coupling 1, before opening the new bottle so the liquid $CO_2$ reaches the solenoid valve 7, it may be necessary to pressurise said conduit "a" above the triple point to prevent the formation of dry ice. This pressure (above the triple point) is reached by the action of the $CO_2$ in gaseous state introduced through the coupling 2. In other words, conduit "d" has the pressure of the container or bottle of gaseous $CO_2$ (around 5-6 MPa). This pressure is reduced by the pressure regulator 4 to a value above the triple point, which is consequently the pressure in conduits "h" and "c" so it can be transmitted to conduits "a", "b" and "g". In sum, all the conduits of the subsystem 110 are pressurised above the triple point of the $CO_2$. To achieve that degree of pressurisation in the conduits, the solenoid valve 7, which controls the entry of $CO_2$ in liquid state is bypassed with a no-return valve 15, allowing the passage of the $CO_2$ in gaseous state upstream of said solenoid valve 7 before introducing $CO_2$ in liquid state in the device through the coupling 1. Thus, all the conduits of the subsystem 110 are pressurised, while preventing the liquid $CO_2$ from leaking through said bypass once the subsystem is supplied with $CO_2$ in liquid state. In other words, conduits "a" and "b" are communicated via the no-return valve 15 so that, if the solenoid valve 7 is closed, flow is allowed from conduit "b" towards conduit "a" but not the other way around. In channel or conduit "b", the $CO_2$ in liquid state is at a pressure of around 50-60 bar (that is, 5.0-6.0 MPa), so it has to be passed through a pressure regulator 11 to lower the pressure to a value close to but above the triple point of the $CO_2$ (0.511 MPa and −56.4° C.). When $CO_2$ in gaseous state passes through conduits "a", "b" and "g", its pressure is above the triple point from the moment it passes through the pressure regulator 4.

Conduits "a" and "d" are preferably equipped with the shut-off valves 13, 14 (or depressurising valves) to depressurise the system if necessary; e.g., to change a component of the device 100.

On the other hand, channels "c" (of $CO_2$ in gaseous state) and "b" (of $CO_2$ in liquid state) must also be connected or communicated by a no-return valve 16, so that the no-return valve 16 can allow circulation of the $CO_2$ in gaseous state towards the solenoid valve 7 but not the other way around. In other words, this prevents the $CO_2$ in liquid state from flowing towards the solenoid valve 8. The reason for this is that during the injection cycle of $CO_2$ in liquid state, in the initial stage, the solenoid valve 8, which controls the $CO_2$ in gaseous state, is opened thereby pressurising the entire subsystem 110 above the triple point.

Once all the conduits of the subsystem 110 are pressurised with $CO_2$ in gaseous state above the triple point, the solenoid valve 7, which controls the passage of the $CO_2$ in liquid state—which is preferably at a pressure between 5 and 6 MPa—opens and allows the passage of the $CO_2$ in liquid state, sweeping the $CO_2$ in gaseous state towards the exit channel "g" on the one hand and towards the no-return valve 16. Without this valve 16, the $CO_2$ in gaseous state would be driven by the $CO_2$ in liquid state and the entire channel containing $CO_2$ in gaseous state (channels "c", "h" and "d") would end up filled with $CO_2$ in liquid state. Thanks to this combination, the $CO_2$ in liquid state can be conducted to exit channel "g" (all the way to the coupling 18) without formation of dry ice inside the conduits and, consequently, no obstructions. In other words, the formation of dry ice is prevented from the liquid $CO_2$ in conduits "a", "b" and "g"; in other words, in all the conduits that the $CO_2$ in liquid state passes through downstream from the solenoid valve 7 and the no-return valve 15.

Lastly, to shut off the injection of $CO_2$ in liquid state and prevent it from expanding inside the conduits it passes through, the solenoid valve 7, which controls the passage of the $CO_2$ in liquid state, must be closed; this will allow the $CO_2$ in gaseous state to sweep all the conduits or channels "b" and "g" of $CO_2$ in liquid state and, once the conduits do not contain any more $CO_2$ in liquid state, valve 8, which controls the entry of $CO_2$ in gaseous state, closes. This ensures that when the solenoid valve 7 is closed, the residual $CO_2$ in liquid state does not turn into dry ice when the pressure drops because the supply of $CO_2$ in liquid state has been interrupted. Note that in this case (when there is $CO_2$ in liquid state in conduit "a"), the $CO_2$ in gaseous state does not sweep conduit "a", which continues to contain $CO_2$ in liquid state at a pressure between 4.5 and 6 MPa (depending on the level of $CO_2$ in liquid state in the tank or bottle supplying conduit "a"), which is why there is no danger of dry ice formation. Note that the pressure in conduit "a" varies according to level of $CO_2$ in liquid state in the container or bottle that supplied this conduit "a". For example, when the bottle of $CO_2$ in liquid state is full, the pressure in this conduit is around 6 MPa, but drops to approximately 4.5 MPa as the level in the bottle drops, which is usually when the bottle has to be changed.

Moreover, the subsystem 110 for regulating the $CO_2$ in liquid state preferably has two pressure regulators 4, 11 to control both the intake pressure of the $CO_2$ in gaseous state (pressure regulator 4) and the pressure in exit channel "g" when the $CO_2$ travels in liquid state (pressure regulator 11). The pressure regulator 4 is placed on the channel that is supplied (through entry 2) with $CO_2$ in gaseous state, upstream from the solenoid valve 8, with the purpose of lowering the intake pressure of $CO_2$ in gaseous state to a pressure close to, but somewhat higher than the triple point. In other words, the pressure regulator 4 is located between channels "d" and "h". Preferably, the pressure regulator 4 is designed to lower the pressure of $CO_2$ in gaseous state to a range from 0.6 to 1.5 MPa, more preferably to a range from 0.8 to 1.3 MPa. For example, in a specific embodiment, this pressure regulator 4 is designed to lower the pressure of $CO_2$ in gaseous state to approximately 1 MPa. This pressure regulator 4 is preferably a single or double diaphragm so that once the solenoid valve 8 closes, the supply pressure (pressure at entry 2) will not be transmitted to the interior of the subsystem 110. The other pressure regulator 11 is located between channel or conduit "b" and exit channel or conduit "g" (which leads to the coupling 18), and which is adjusted so that the pressure of the $CO_2$ in liquid state drops to a level slightly above that of the $CO_2$ in gaseous state, thereby satisfying the desired injection conditions. Preferably, the pressure regulator 11 is designed to lower the pressure of $CO_2$ in liquid state to a range from 0.6 to 1.8 MPa, more preferably to a range from 0.8 to 1.6 MPa. For example, in a specific embodiment, this pressure regulator 11 is designed to lower the pressure of $CO_2$ in liquid state at the exit 18 to approximately 1.2 MPa. Conduit "b" communicates the solenoid valve 7 with the pressure regulator 11 and conduit "g" communicates the pressure regulator 11 with the injection coupling 18, thereby connecting the device 100 with the pertinent $CO_2$ in liquid state injection system. This injection system for $CO_2$ in liquid state lies outside the scope of the present disclosure. As an example, it can be comprised by a conduit that ends in a converging nozzle, similar to those used for the cutting fluid, or by a connection that communicates with the internal channel of the cutting tool to be used. The pressure regulator 11 must be adjusted so the exit pressure is above the triple point of the $CO_2$ (0.511 MPa), preferably between 0.6 and 1.8 MPa, more preferably between 0.8 and 1.6 MPa.

Preferably, the regulation subsystem of $CO_2$ in liquid state 110 is equipped with a safety valve 17 on conduit "c", designed to supply (with a setting) a pressure slightly higher than (preferably above 0.7 MPa, more preferably between 0.8 and 2 MPa; for example, around 1.5 MPa) the working pressure of the $CO_2$ in gaseous state to prevent damaging the system if there is a failure in the no-return valve 16, which connects the two channels "c" and "b" or the pressure regulator 4 located on the channel that contains $CO_2$ in gaseous state. That is, the safety valve 17 is needed to prevent overpressure that may occur for reasons not involving normal use of the device 100. The pressure supplied by the safety valve 17 must be somewhat higher than the pressure of the $CO_2$ in gaseous state; otherwise, the valve 17 will be enabled as soon as solenoid valve 8, which allows the passage of $CO_2$ in gaseous state, is opened.

As shown in FIGS. 1A-1E, part of the subsystem 110 for the supply of $CO_2$ in liquid state is located in the housing 30 and part is located outside the housing. Thus, the connections or couplings 1, 2 used for the entry in the device of liquid $CO_2$ and gaseous $CO_2$, respectively, the pressure regulators 4, 11, the depressurising valves 13, 14, the rated safety valve 17 and the connection or coupling 18 for device injection of liquid $CO_2$ (for cooling) are all located outside the housing 30. The control means 22, shared by both subsystems, are also located outside the housing 30. On the contrary, inside the housing 30 and protected by it are the solenoid valve 7 of liquid $CO_2$, the solenoid valve 8 of gaseous $CO_2$, the no-return valves 15, 16 and the various conduits of liquid and gaseous $CO_2$ that pass through the subsystem 110 from its entries 1, 2 to the exit 18.

The second subsystem 120 (in charge of pulverising the cutting oil to form a spray of cutting oil micro-particles in liquid state) has been developed as a minimum quantity lubrication (MQL) technique with two channels, which lies outside the scope of the present disclosure; therefore, up until the moment it is injected in the corresponding tool or machine, the oil is not pulverised by a nozzle 19 due to the Venturi effect. This eliminates the limits on the length of the channels presented in traditional, single-channel systems, a restriction derived from the condensation of the microparticles on the walls of the conduits.

This cutting oil pulverising subsystem 120 has an entry or coupling 3 for pressurised air to a first channel or conduit "i" of the subsystem 120. Preferably, after this entry 3, in conduit or channel "i" there is a pressure regulator 5 that controls the pressure of the air supply of the subsystem 120. Normally, the pressurised air entry or coupling 3 is connected to a general pressurised air circuit that is usually at a pressure between 0.6 and 1 MPa. The pressure regulator 5 is then in charge of lowering that pressure. That is, the pressure regulator 5 controls the pressure of the air reaching conduit or channel "j", so the pressure in channel "j" is around 0.5 MPa. The subsystem also comprises a tank 6 that contains a cutting fluid, which accesses a second channel or conduit "k" of the subsystem 120. As an expert knows, a cutting fluid is a product comprising one or more oils, which is used as a lubricant and coolant in shaving removal machining operations. The cutting fluid may or may not contain water. It is also frequently called cutting oil. The present disclosure uses a conventional "water-free" cutting oil that lies outside the scope of the disclosure. The subsystem also has two solenoid valves 9, 10 that control the passage of air and cutting oil, respectively. The solenoid valve 9, which controls the passage of air, is preferably located after the pressure regulator 5, that is, between conduits or channels "j" and "f", while the solenoid valve 10, which controls the passage of cutting fluid is preferably located after the cutting fluid tank 6, that is, between conduits or channels "k" and "e". After this, the two channels through which the pressurised air (channel "f") and cutting fluid (channel "e") travel are joined axially by a coupling or connection 12. Preferably, a T-shaped coupling is used for this connection 12. In other words, conduits "f" and "e" connect the solenoid valves 9, 10, respectively, with the T-shaped coupling 12. Preferably, the selected conduit "e" is made in a flexible material or flexible materials. More preferably, conduit "e" is manufactured in flexible polymer materials, such as teflon, to attenuate load losses caused by oil travelling through its interior. As for the rest of the conduits of the device 100, these can be either rigid or flexible, as long as they withstand the operating pressures.

Figure 4:
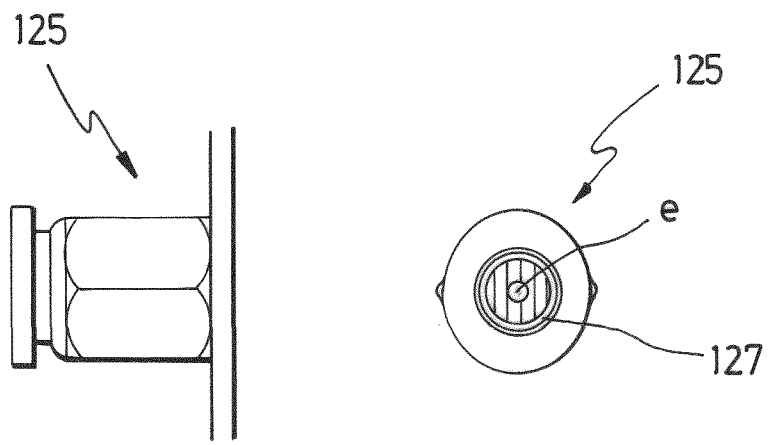
FIG. 4 shows two views (side and front) of the coupling (2-channel fitting) used to couple the coupling exit of the pressurised air and cutting oil channels of the lubrication subsystem to the hose that leads to the nozzle, according to a possible embodiment of the disclosure.

The coupling 12 has two entries, preferably designed so conduit "f" connects to the coupling 12 by means of an adaptor or similar coupling, while conduit "e" is preferably inserted inside it by means of an airtight coupling to prevent air leaks through the walls of said connection. FIG. 4 illustrates a possible adaptor 125. Inside the coupling 12, the air introduced from conduit "f", as well as conduit "e", are conducted towards the exit of the coupling 12. The exit of this coupling or connection 12 is a coaxial channel or conduit 20 used to conduct pressurised air and cutting oil. In a possible embodiment, this coaxial conduit 20 is a hose with two coaxial channels. That is, the hose 20 is comprised by an internal conduit—preferably flexible—that is surrounded by an outer wall so the cutting oil can flow on the inside and the air can flow on the outside. This double coaxial conduit 20 conducts the fluids to a nozzle 19 located at the end of coaxial conduit 20. The nozzle 19, using the Venturi effect, pulverises the oil transported from the oil tank 6, forming micro-particles of pulverised oil. Therefore, at the exit, nozzle 19 supplies pressurised air with pulverised oil.

Preferably, the exit of the coupling 12 comprises an adaptor 125 as shown in FIG. 4, which connects the coupling 12 with the hose 20, so the air surrounds oil conduit "e" coaxially, which therefore remains inside the adaptor 125. The cross-section view at the right of FIG. 4 shows the oil channel "e" surrounded coaxially by the conduit or channel 127, which contains air.

Figure 5:
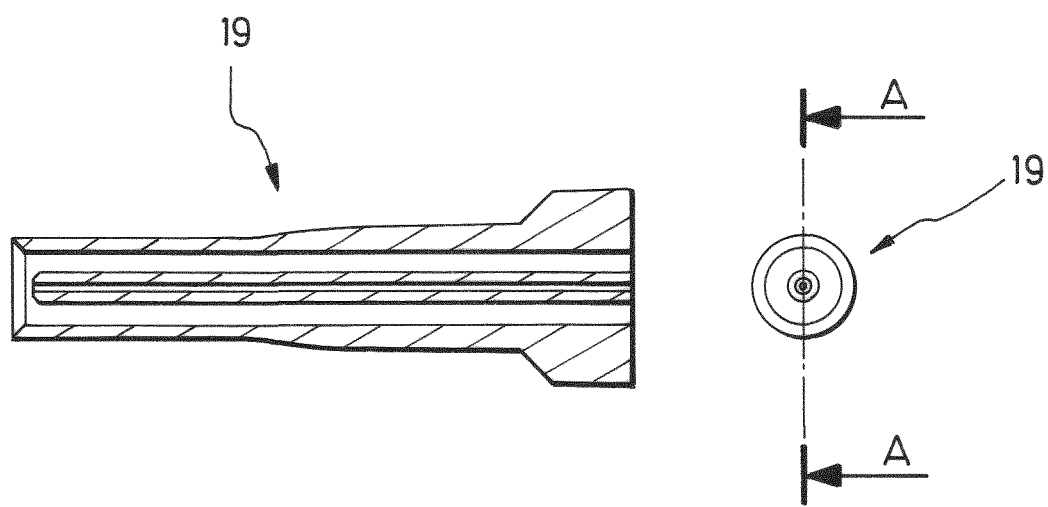
FIG. 5 shows a lengthwise view (left side) and a cross-section view (right side) of the 2-channel nozzle located at the end of the hose used in the MQL subsystem, according to a possible embodiment of the disclosure.

Lastly, the exit hose or conduit 20 is connected at one end to the adaptor 125 of the exit of the coupling 12 and provided with a nozzle 19 at the end, like the MQL nozzle illustrated in FIG. 5. On the left, FIG. 5 shows a lengthwise view of the nozzle 19, and the right side shows a cross-section view (front) of the nozzle 19.

As shown in FIGS. 1A-1E, part of the oil pulverisation system 120 is located in the housing 30 and part is located outside the housing. Thus, the connection or coupling 3 used to introduce pressurised air into the device, the cutting oil tank 6, the pressure regulator 5 and the MQL connection or nozzle 19 are located outside the housing 30. On the contrary, inside the housing 30 and protected by it are the air solenoid valve 9, the cutting oil solenoid valve 10, the connection or coupling 12 and the hose 20 that connects the coupling 12 to the nozzle 19.

When this subsystem 120 starts operating, the solenoid valve 9 located between the conduit or channel "j" and the conduit or channel "f" opens, the air starts circulating through them and the solenoid valve 10 located between the conduit or channel "k" and the conduit or channel "e" also opens immediately and the cutting oil starts circulating through them. However, the latter solenoid valve 10 opens intermittently, that is, it changes status continuously at a frequency that will determine the flow of cutting oil that is injected. Thus, the flow of cutting oil that passes through the conduit or channel "e" to the coupling or connection 12 and therefore to the nozzle 19, is controlled by pulses. With this pulse control method, use of valves and air meters used by traditional MQL dual-channel systems is avoided; control over the flow of cutting oil is thus improved.

For the device 100 to run properly, it must be supplied with $CO_2$ in liquid state through the corresponding entry or coupling 1, with $CO_2$ in gaseous state through the corresponding entry or coupling 2 and with pressurised air through the corresponding entry or coupling 3. In addition, the tank 6 must contain a cutting fluid that can be pulverised. In a possible embodiment, the cutting fluid is cutting oil with a kinematic viscosity of 88 $mm^2/s$ at 20° C. and a density of 0.92 $g/cm^3$. In a possible embodiment, the entries or couplings 1, 2 and 3 are adaptors. Alternatively, the entries or couplings 1, 2 and 3 are implemented using any connection system that can be used to communicate the corresponding supply conduits and the proper components of the device. The pressure at which the $CO_2$ in gaseous state is introduced (through entry 2 to conduit "d") must be higher than the pressure of the triple point (0.511 MPa). Preferably, the $CO_2$ in gaseous state in conduit "d" is approximately at a pressure between 4.5 and 6 MPa. The intake pressure through conduit "a" of the $CO_2$ in liquid state must be at least slightly higher than the pressure of the $CO_2$ in gaseous state to optimise the cooling capacity of the $CO_2$ in liquid state once it is injected in the cutting area. Preferably, the intake pressure of liquid $CO_2$ through conduit "a" varies between 4.5 and 6 MPa, depending on the level of $CO_2$ in liquid state in the container or bottle that supplies the fluid to conduit "a" through coupling 1.

Lastly, the pressure of the air used to supply the MQL subsystem (subsystem 120) through the coupling 3 is preferably between 0.1 and 1 MPa, so it can cause enough depression due to the Venturi effect in the nozzle 19 to drag the cutting oil contained in the tank 6. In a more preferred embodiment, the pressure chosen as optimal pressure in conduits "j" and "f" is around 0.5 MPa.

In embodiments of the disclosure, the entry or coupling 1 is connected to the solenoid valve 7 directly via conduit "a". However, the couplings or entries 2 and 3 are connected previously to their corresponding pressure regulators 4 and 5 and these are connected in turn to their corresponding solenoid valves 8 and 9. Finally, the tank 6 is connected to the solenoid valve 10, which is recommended to be installed at the bottom of the tank. Alternatively, the solenoid valve 10 can be placed in another part of the tank.

The equipment is fully controlled by control means 22, preferably implemented by a PLC that is preferably programmed using the algorithm described in FIG. 2. This algorithm is used to govern the four solenoid valves 7, 8, 9 and 10 according to operational requirements. It allows the use of cryogenic cooling technology and minimum quantity lubrication both together and separately, and can be used to control the flow of oil or some other cutting fluid used during micro-pulverisation.

The control algorithm in FIG. 2 is implemented as follows: Once the algorithm is started (40), a decision has to be made (41) whether to activate the MQL subsystem or not (i.e., subsystem 120). That is, it has to be decided whether to inject micro-pulverised cutting fluid or not. If at this stage (41) it is decided that subsystem 120 will be activated, the solenoid valve 9 is activated (42) and then the solenoid valve 10 is activated (43). A query is then submitted (44) to find out whether to change the flow of cutting fluid. If so, the flow of cutting fluid is changed (45) and querying continues (44) until changing the flow of the cutting fluid is no longer required. Another query is then submitted (46) to decide whether to disconnect subsystem 120. If not, the query (44) is repeated to decide whether to change the flow of cutting oil. If, on the contrary, subsystem 120 has to be disconnected, the solenoid valve 10 is deactivated (47) and then the solenoid valve 9 is deactivated (48). Then the algorithm submits another query (41) to find out whether to activate subsystem 120 or not.

If, on the contrary, at that stage (41) it is decided not to activate subsystem 120, then the algorithm queries (51) to decide whether to activate the cryogenic system only (i.e, subsystem 110) or not. If at this stage (51), it is decided to activate subsystem 110 only, the solenoid valve 8 is activated (52) and then the conduits are pressurised (53). The solenoid valve 7 is then activated (54). Another query is submitted (55) to decide whether to disconnect subsystem 110. If not, another query (55) is submitted to find out whether the decision has changed. If, on the contrary, subsystem 110 has to be disconnected, the solenoid valve 7 is deactivated (56) and then the liquid $CO_2$ is eliminated (57) and the solenoid valve 8 is deactivated (58). The algorithm then queries again (51) to find out whether to activate subsystem 110 alone or not.

If at this stage (51) it is decided that subsystem 110 is not going to be activated, then the algorithm submits a query (61) to decide whether to activate the cryogenic subsystem (i.e., subsystem 110) and subsystem 120 simultaneously. If at this stage (61) it is decided to activate the two subsystems 110 and 120, the solenoid valves 9, 8 are activated (62) and then the conduits are pressurised (63). The solenoid valves 7, 10 are then activated (64). The query (65) is repeated to decide whether to disconnect the two subsystems 110, 120. If not, another query (69) is submitted to decide whether to change the flow of the cutting fluid. If so, the flow of cutting fluid is changed (70) and querying (69) continues until changing the flow of the cutting fluid is no longer required. The query (65) is submitted again to decide whether the two subsystems 110 and 120 should be disconnected. If yes, the solenoid valves 7, 10 are deactivated (66), followed by the elimination (67) of liquid $CO_2$ and then the solenoid valves 9, 8 are deactivated (68). Then the algorithm queries again (61) to find out whether to activate the two subsystems 110, 120 simultaneously or not. If no, the algorithm finishes (71).

In other words, as seen in the algorithm outlined in FIG. 2, the device 100 can make the two subsystems 110, 120 work simultaneously (stage 61) or make the subsystem 120 work alone (stage 41) or make the subsystem 110 work alone (stage 51). For example, operation of the two subsystems 110, 120 can be alternate.

The device 100 is portable and installation can be completely "plug&play", both in new and existing machine-tools and it can be used in any of the most common machining operations. The device 100 is completely separate from the machine.

Furthermore, the disclosure is not limited to the specific embodiments described, but also covers, for example, variations performed by the expert on the material (for example, regarding selection of materials, dimensions, components, configuration, etc.), giving rise to the claimed variants.

The invention claimed is:

1. A device for cooling and lubricating a tool during a chip removal machining process, wherein it comprises:
   a first subsystem for cryogenic cooling that comprises: a first entry configured to introduce $CO_2$ in liquid state in a first conduit of the device; a first exit configured to supply $CO_2$ in liquid state from a second conduit of the device; a third conduit located between said first conduit and second conduit; and means for preventing the formation of dry ice in said first, second and third conduits, wherein said means for preventing the formation of dry ice in said first, second and third conduits are implemented by means of means for pressurizing said conduits above the triple point of the $CO_2$ before injecting the $CO_2$ in liquid state through the exit; wherein said means for pressurizing said first, second and third conduits above the triple point of the $CO_2$ comprises a second entry configured to introduce $CO_2$ in gaseous state in a fourth conduit of the device; a fifth conduit placed after said fourth conduit; a first solenoid valve configured to control the passage of $CO_2$ in liquid state between the first conduit and the third conduit; a second solenoid valve configured to control the passage of $CO_2$ in gaseous state between the fifth conduit and a sixth conduit; a first no-return valve disposed to communicate said first conduit and third conduit, so that when said first solenoid valve is closed, passage of $CO_2$ in gaseous state is allowed from the third conduit towards the first conduit before introducing the $CO_2$ in liquid state through the first entry; and a second no-return valve disposed to communicate said third and sixth conduit, so that when said second solenoid valve is open, circulation of the $CO_2$ in gaseous state is allowed from the sixth conduit towards the first solenoid valve but not the other way around, impeding the advance of $CO_2$ in liquid state towards the second solenoid valve;
   a second subsystem for lubrication that comprises means for supplying micro-particles of a cutting oil in liquid state;

said first subsystem and second subsystem being independent from each other and said first subsystem and second subsystem being configured to operate both simultaneously or either one alone.

2. The device of claim 1, wherein said means for pressurizing said first, second and third conduits above the triple point of the $CO_2$ also comprise a first shut-off valve placed on the first conduit and a second shut-off valve placed on the fourth conduit, configured to depressurize the first subsystem if necessary.

3. The device of claim 1, wherein said means for pressurizing said first, second and third conduits above the triple point of the $CO_2$ also comprise a first pressure regulator for $CO_2$ in liquid state and a second pressure regulator for $CO_2$ in gaseous state, said first pressure regulator being placed between the third and second conduits; and said second pressure regulator being placed between said fourth and fifth conduits.

4. The device according to claim 1, wherein said means for supplying micro-particles of a cutting oil in liquid state, comprise: a third entry configured to introduce pressurized air into a seventh conduit of the device; a device configured to supply cutting oil in liquid state through an eighth conduit; a third solenoid valve configured to control the passage of pressurized air to the seventh conduit; a fourth solenoid valve to control the passage of cutting oil to the eighth conduit; a coupling designed to join said seventh and eighth conduits in a single conduit; and a nozzle placed at the end of the exit of said conduit, said nozzle being configured to pulverize the cutting oil by the Venturi effect so it can be injected.

5. The device of claim 4, wherein said coupling is a T-shaped coupling where said seventh and eighth conduits are joined axially to said conduit.

6. The device of claim 5, wherein said conduit is a hose with two coaxial channels: an internal conduit configured so the cutting oil can flow in liquid state, said internal conduit being surrounded by an outer wall, configured so the pressurized air can flow between the internal conduit and the outer wall.

7. The device of claim 4, wherein said means for supplying micro-particles of a cutting oil in liquid state, comprise a third pressure regulator located between a ninth conduit placed at the exit of said third entry and a tenth conduit placed at the entry of said third solenoid valve.

8. The device according to claim 1, further comprising control means configured to control both the first subsystem and the second subsystem.

9. The device according to claim 1, comprising a plurality of magnetic legs configured to couple to a machine-tool.

10. A method of operating a device for cooling and lubricating a tool during a chip removal machining process, comprising said device a first subsystem for cryogenic cooling, comprising: a first entry configured to introduce $CO_2$ in liquid state in a first conduit of the device; a first exit configured to supply $CO_2$ in liquid state from a second conduit of the device; a third conduit located between said first and second conduit; and means for preventing the formation of dry ice in said first, second and third conduits; and a second subsystem for lubrication, comprising means for supplying micro-particles of a cutting oil in liquid state; wherein said means for preventing the formation of dry ice comprise means for pressurizing said first, second and third conduits above the triple point of the $CO_2$, wherein said means for pressurizing said conduits comprising: a second entry configured to introduce $CO_2$ in gaseous state in a fourth conduit of the device; a fifth conduit located after said fourth conduit; a first solenoid valve configured to control the passage of $CO_2$ in liquid state between the first conduit and the third conduit; a second solenoid valve configured to control the passage of $CO_2$ in gaseous state between the fifth conduit and a sixth conduit; a first no-return valve placed to communicate said first conduit and third conduit; and a second no-return valve placed to communicate said third conduit and sixth conduit; and wherein said means for supplying micro-particles of a cutting oil in liquid state comprise: a third entry configured to introduce pressurizing air into a seventh conduit of the device; a tank configured to supply cutting oil in liquid state through an eighth conduit; a third solenoid valve configured to control the passage of pressurized air in the seventh conduit; a fourth solenoid valve for controlling the passage of cutting oil in the eighth conduit; a coupling designed to join said seventh conduit and eighth conduit in a single ninth conduit, and a nozzle placed at the output end of said ninth conduit, said nozzle being configured to pulverize the cutting oil by the Venturi effect so it can be injected, the method comprising the following stages for the injection of $CO_2$ in liquid state through the coupling:

opening the second solenoid valve to control the passage of $CO_2$ in gaseous state between the fifth conduit and the sixth conduit;

pressurizing the first, second and third conduits above the triple point of the $CO_2$;

opening the first solenoid valve that controls the passage of $CO_2$ in liquid state between the first conduit and the third conduit;

injecting $CO_2$ in liquid state through the first exit.

11. The method of claim 10, which comprises the following stages to interrupt the injection of $CO_2$ in liquid state through the first exit:

closing the first solenoid valve that controls the passage of $CO_2$ in liquid state;

sweeping at least the second and third conduits of $CO_2$ in liquid state by injecting $CO_2$ in gaseous state pressurized above the triple point;

closing the second solenoid valve that controls the $CO_2$ in gaseous state.

12. The method for either claim 10, which comprises the following stages for simultaneous injection of $CO_2$ in liquid state and a spray formed by micro-particles of a cutting oil in liquid state:

opening the second solenoid valve to control the passage of $CO_2$ in gaseous state and opening the third solenoid valve controlling the passage of pressurized air towards the seventh conduit (f);

pressurizing the first, second and third conduits above the triple point of the $CO_2$;

opening the first solenoid valve that controls the passage of CO2 in liquid state and opening the fourth solenoid valve that controls the passage of the cutting oil.

13. The method of claim 12, which comprises the following stages to interrupt the simultaneous injection of $CO_2$ in liquid state and a spray formed by lubricant micro-particles in liquid state:

closing the first solenoid valve that controls the passage of $CO_2$ in liquid state and closing the fourth solenoid valve that controls the passage of the cutting oil;

sweeping at least the second and third conduits of $CO_2$ in liquid state by injecting $CO_2$ in gaseous state pressurized above the triple point;

closing the second solenoid valve to control the passage of $CO_2$ in gaseous state and closing the third solenoid valve controlling the passage of pressurized air.

\* \* \* \* \*